US010616291B2

(12) United States Patent
Procter et al.

(10) Patent No.: US 10,616,291 B2
(45) Date of Patent: Apr. 7, 2020

(54) RESPONSE CACHING

(71) Applicant: GitHub, Inc., San Francisco, CA (US)

(72) Inventors: Michael Procter, Nottingham (GB);
Jeff Robert King, Charlottesville, VA (US); Michael Richard Haggerty, Berlin (DE); Vicent Pere Marti Guardiola, Madrid (ES)

(73) Assignee: GITHUB, INC., Redmond, WA (US)

( * ) Notice: Subject to any disclaimer, the term of this patent is extended or adjusted under 35 U.S.C. 154(b) by 0 days.

(21) Appl. No.: 15/547,846

(22) PCT Filed: Oct. 18, 2016

(86) PCT No.: PCT/US2016/057467
§ 371 (c)(1),
(2) Date: Aug. 1, 2017

(87) PCT Pub. No.: WO2018/075009
PCT Pub. Date: Apr. 26, 2018

(65) Prior Publication Data
US 2019/0238603 A1  Aug. 1, 2019

(51) Int. Cl.
*G06F 16/172* (2019.01)
*G06F 16/182* (2019.01)
(Continued)

(52) U.S. Cl.
CPC ........ *H04L 65/4069* (2013.01); *G06F 16/172* (2019.01); *G06F 16/182* (2019.01);
(Continued)

(58) Field of Classification Search
CPC . G06F 16/172; G06F 16/182; H04L 65/4069; H04L 67/10
See application file for complete search history.

(56) References Cited

U.S. PATENT DOCUMENTS 8,046,432 B2 * 10/2011 Yoo ...................... H04L 67/2842
709/213
9,367,554 B1  6/2016 Heemskerk et al.
(Continued)

FOREIGN PATENT DOCUMENTS

WO  2018075009  4/2018

OTHER PUBLICATIONS

"International Application Serial No. PCT/US2016/057467, International Search Report dated Jan. 9, 2017", 2 pgs.
(Continued)

*Primary Examiner* — John M Macilwinen
(74) *Attorney, Agent, or Firm* — Workman Nydegger

(57) ABSTRACT

A machine receives, from a first client device, a first request for provision of data that is specified by the first request. The machine creates a datastream that contains the data and initiates provision of the datastream to the first client device. The machine creates a marker file that corresponds to the first request, and existence of the marker file indicates that the provision of the datastream to the first client device is incomplete. While the marker file exists, if the machine receives, from a second client device, a second request for provision of the same data, the machine caches the now twice-requested data in a data cache, and the machine may provide the data from the data cache to the second client device. This can avoid one or more retrieval operations or other preparations for providing the data to the second client device.

20 Claims, 10 Drawing Sheets

(51) Int. Cl.
  *G06F 12/0813*   (2016.01)
  *G06F 12/084*    (2016.01)
  *H04L 29/06*     (2006.01)
  G06F 12/0842    (2016.01)
  H04L 29/08      (2006.01)

(52) U.S. Cl.
  CPC ........ *G06F 12/084* (2013.01); *G06F 12/0813* (2013.01); *G06F 12/0842* (2013.01); *G06F 2212/154* (2013.01); *G06F 2212/163* (2013.01); *H04L 67/10* (2013.01)

(56) References Cited

U.S. PATENT DOCUMENTS

| | | | |
|---|---|---|---|
| 2008/0198997 A1* | 8/2008 | Sterman | H04L 12/66 379/220.01 |
| 2013/0152047 A1 | 6/2013 | Moorthi et al. | |
| 2014/0304361 A1 | 10/2014 | Chauhan et al. | |

OTHER PUBLICATIONS

"International Application Serial No. PCT/US2016/057467, Written Opinion dated Jan. 9, 2017", 5 pgs.

\* cited by examiner

RESPONSE CACHING

RELATED APPLICATIONS

This application is a U.S. National Stage Filing under 35 U.S.C. 371 from International Patent Application Serial No. PCT/US2016/057467, filed Oct. 18, 2016, the content of which is incorporated herein by reference in its entirety.

TECHNICAL FIELD

The subject matter disclosed herein generally relates to the technical field of special-purpose machines that provide or otherwise facilitate data management services, including computerized variants of such special-purpose machines and improvements to such variants, and to the technologies by which such special-purpose machines become improved compared to other special-purpose machines that provide or otherwise facilitate data management services. Specifically, the present disclosure addresses systems and methods to facilitate response caching.

BACKGROUND

A machine (e.g., a computer or a system of multiple networked computers) may be configured to interact with one or more users by responding to (e.g., answering or otherwise servicing) requests for specified data. For example, a server machine configured as a search engine can receive a search query from a client device and respond to the search query with search results generated by executing the search query against a database that stores potential search results. As another example, a server machine configured as a software distribution server can receive a data request (e.g., for a data record, a software application, or a code fragment) from a client device and respond to the data request by retrieving and providing the requested data (e.g., the data record, the software application, or the code fragment) to the client device. In many cases, however, large numbers of requests (e.g., from many different client devices) can overwhelm a server machine or otherwise exceed its computing resources.

BRIEF DESCRIPTION OF THE DRAWINGS

Some embodiments are illustrated by way of example and not limitation in the figures of the accompanying drawings.

DETAILED DESCRIPTION

Figure 1:
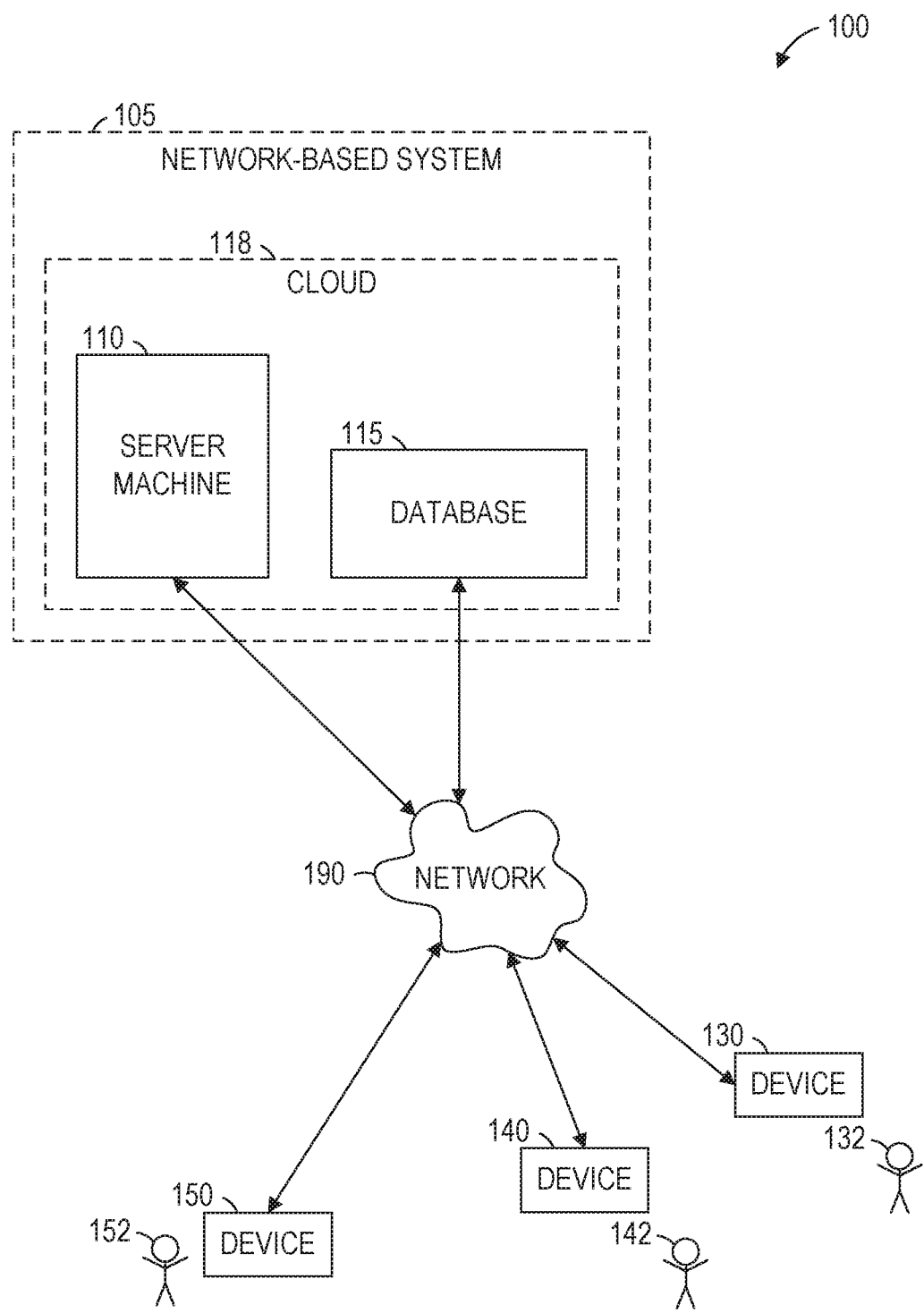
FIG. 1 is a network diagram illustrating a network environment suitable for response caching, according to some example embodiments.

Example methods (e.g., algorithms) are executable to perform or otherwise facilitate response caching (e.g., in a data providing context, such as a software distribution context), and example systems (e.g., special-purpose machines) are configured to perform or otherwise facilitate response caching. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine configured to respond to user requests for data may be improved (e.g., made more efficient) by configuring the machine to cache frequently provided responses. That is, the machine may be configured to store frequently provided responses in a data cache to avoid or reduce one or more redundancies in retrieving or otherwise preparing the same response for sending to multiple client devices from which requests have been received. Although it is possible to cache every response, doing so may introduce inefficiencies that offset, cancel, or overwhelm the efficiencies obtained from caching. In view of this, the machine can be configured to cache only those responses that are re-requested frequently. For example, the machine can be configured to cache a response when (e.g., only when) a second request is received while a first request is still being fulfilled. In additional examples, a third request, a fourth request, a fifth request, or a sixth request is what triggers the caching of the response. For clarity of explanation, most of the discussion herein focuses on example embodiments in which the second request triggers the caching of the response.

According to certain example embodiments of the systems and methods discussed herein, a marker file is created by the machine and used to determine (e.g., detect) that the first request is still being fulfilled (e.g., that provision of the response to the first client device is incomplete). In alternative example embodiments, one or more other types of marker data (e.g., presence or absence of a data record in a database, contents of a data record in a database, contents of a data bit in memory, or presence or absence of a running process) are used instead of the marker file.

As configured according to certain example embodiments of the systems and methods described herein, the machine (e.g., a server machine or a system of server machines) receives, from a first client device, a first request for provision of data that is specified by the first request. The machine then creates a datastream that contains the data specified by the first request and initiates provision of the datastream to the first client device. The machine also creates a marker file that corresponds to the first request (e.g., identifies the data requested by the first request). The existence of the marker file indicates that the provision of the datastream to the first client device is incomplete. While the marker file exists, if the machine receives, from a second client device, a second request for provision of the same data, the machine caches the data in a data cache (e.g., in response to the second request being received while the marker file exists) and may provide the data from the data cache to the second client device (e.g., to avoid one or more retrieval operations or other preparations for providing the data to the second client device).

According to some example embodiments, the marker file is deleted by the machine after the provision of the datastream to the first client device is complete. In other example embodiments, the marker file is deleted after provision of the data to the second client device is complete. Furthermore, the creating of the marker file may include generating a hash of the first request and generating a file name of the marker file based on the generated hash of the first request. This may have the effect of creating a filename that contains an identifier of the requested data or otherwise identifies the requested data.

Furthermore, according to various example embodiments, one or more additional factors (e.g., beyond the existence of the marker file when the second request is received) can influence the decision by the machine to cache the data in the data cache. Examples of such additional factors include: the time elapsed since the previous similar request (e.g., the first request), the number and timing of previous similar requests (e.g., whether their corresponding responses were cached or not), the computational expense of preparing responses to previous similar requests (e.g., non-cached responses), the current processor load, the current processor capacity, the amount of storage space that the data cache has available, the amount of storage space that the response would occupy in the data cache, whether the incoming request (e.g., second request) was initiated by a user who has paid for a particular level of service (e.g., a premium level service), or any suitable combination thereof. Moreover, one or more of these factors can influence the decision by the machine to delete the cached data from the data cache. Incorporation of one or more of these additional factors may thus improve the overall performance of the machine. Additional variations are discussed in detail below.

FIG. 1 is a network diagram illustrating a network environment 100 suitable for response caching, according to some example embodiments. The network environment 100 includes a server machine 110, a database 115, and devices 130, 140, and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services, such as software distribution services, to one or more of the devices 130, 140, and 150). The server machine 110 and the devices 130, 140, and 150 may each be implemented in a special-purpose (e.g., specialized) computer system, in whole or in part, as described below with respect to FIG. 10.

Also shown in FIG. 1 are users 132, 142, and 152. One or more of the users 132, 142, and 152 may be a human user (e.g., a human being), a machine user (e.g., a computer configured by a software program to interact with the device 130, 140, or 150), or any suitable combination thereof (e.g., a human assisted by a machine or a machine supervised by a human). The user 132 is associated with (e.g., corresponds to) the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Similarly, the user 142 is associated with the device 140 and may be a user of the device 140. As an example, the device 140 may be a desktop computer, a vehicle computer, a tablet computer, a navigational device, a portable media device, a smart phone, or a wearable device (e.g., a smart watch, smart glasses, smart clothing, or smart jewelry) belonging to the user 142. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between or among the server machine 110 and one or more of the devices 130, 140, and 150). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
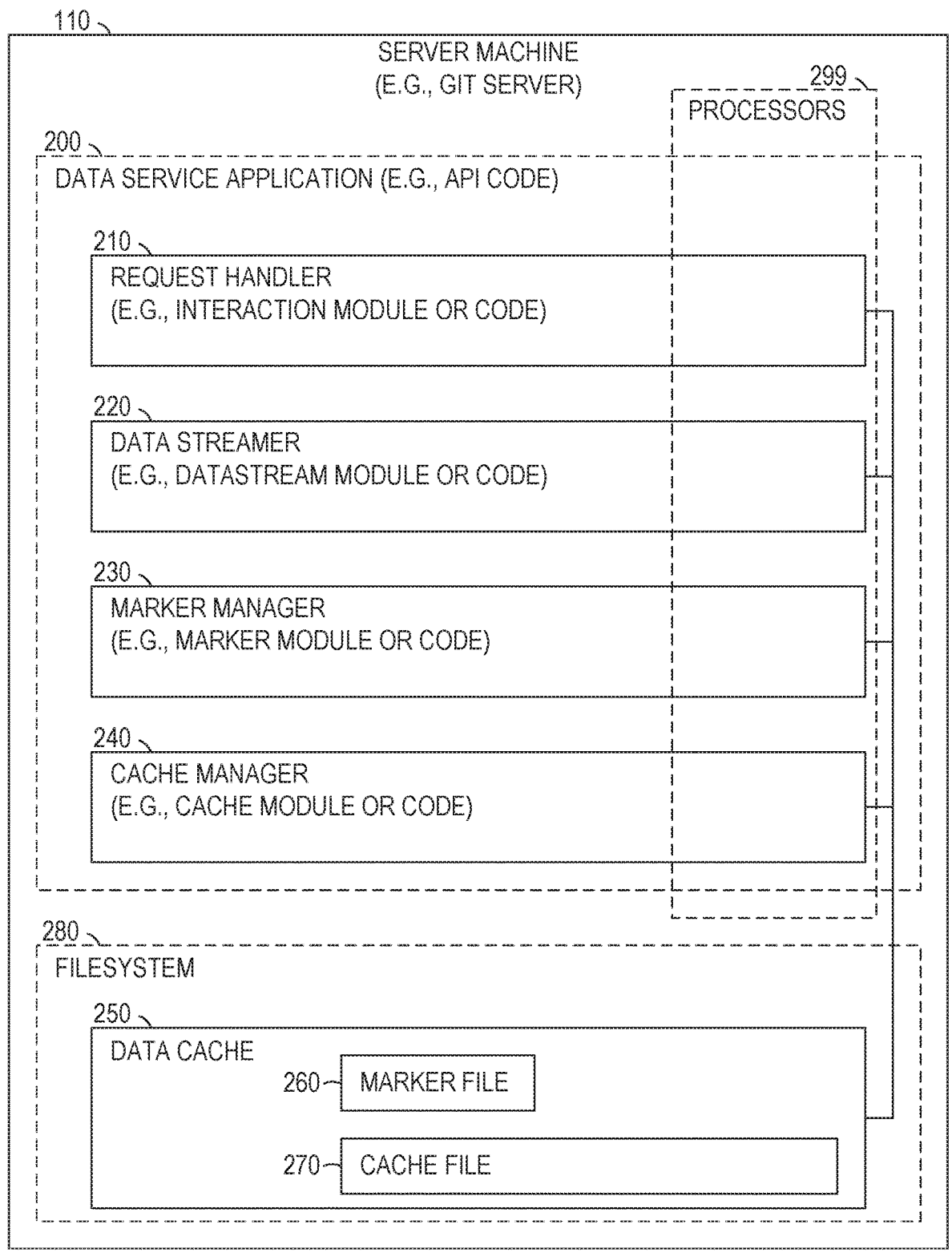
FIG. 2 is a block diagram illustrating components of a server machine suitable for response caching, according to some example embodiments.

FIG. 2 is a block diagram illustrating components of the server machine 110, according to some example embodiments. The server machine 110 may be or include a git server and is shown as including a request handler 210, a data streamer 220, a marker manager 230, a cache manager 240, and a data cache 250, all configured to communicate with each other (e.g., via a bus, shared memory, or a switch). The request handler 210 may be or include an interaction module (e.g., a request interaction module) or other interaction handling code. The data streamer 220 may be or include a datastream module (e.g., a datastream creation and provision module) or other datastream handling code. The marker manager 230 may be or include a marker module (e.g., marker file management module) or other marker handling code. The cache manager 240 may be or include a cache module (e.g., cache management module) or other cache handling code.

The data cache 250 is shown in FIG. 2 as including (e.g., containing or storing) a marker file 260 and a cache file 270. The data cache 250 may be included in a filesystem 280 (e.g., on a disk drive, solid-state drive, or other storage device) and may form all or part of the filesystem 280. Although FIG. 2 illustrates the filesystem 280 and the data cache 250 being contained in the server machine 110, the filesystem 280 and the data cache 250 may be contained in the database 115, according to certain example embodiments.

As shown in FIG. 2, the request handler 210, the data streamer 220, the marker manager 230, the cache manager 240, or any suitable combination thereof may form all or part of a data service application 200 (e.g., a software application, an applet, a mobile app, or other executable software) that is stored (e.g., installed) on the server machine 110 (e.g., in response to or otherwise as a result of data being received by the server machine 110 via the network 190). For example, the data service application 200 may be or include application programming interface (API) code or other user-responsive software that is executable by the server machine 110. Furthermore, one or more processors 299 (e.g., hardware processors, digital processors, or any suitable combination thereof) may be included (e.g., temporarily or permanently) in the data service application 200, the data streamer 210, the marker manager 230, the cache manager 240, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

FIGS. 3, 4, 5, and 6 are interaction flowcharts illustrating operations of a method 300 of response caching, according to some example embodiments. The interaction flowcharts also show data flows among the server machine 110, the device 130, the device 140, and the device 150. Operations in the method 300 may be performed using components (e.g., modules) described above with respect to FIG. 2, using one or more processors (e.g., microprocessors or other hardware processors), or using any suitable combination thereof.

Figure 3:
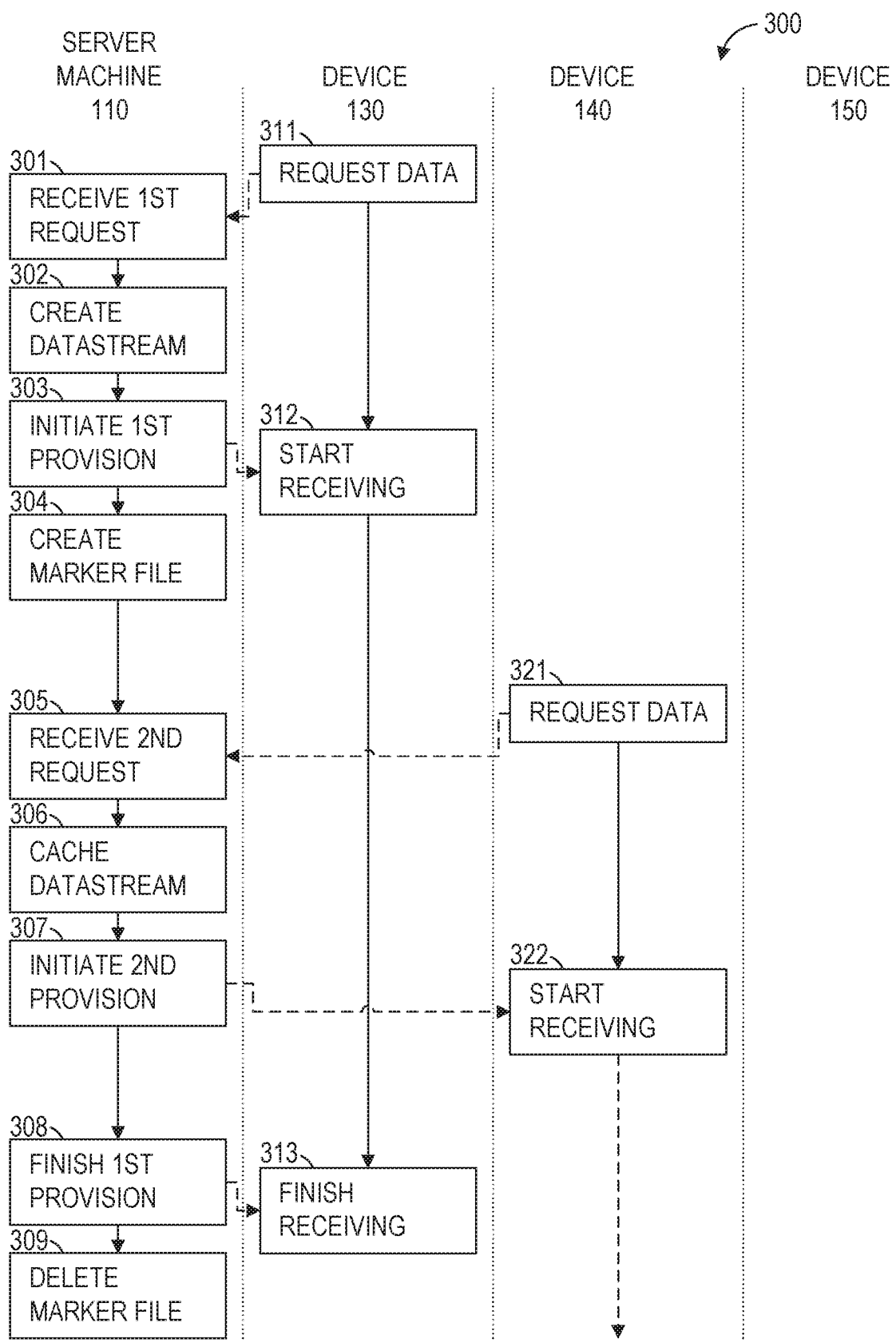
FIGS. 3, 4, 5, and 6 are interaction flowcharts illustrating operations of a method of response caching, according to some example embodiments.

The method 300 includes at least operations 301, 302, 303, 304, 305, and 306, which may be performed by the server machine 110 (e.g., using components described above with respect to FIG. 2). As shown in FIG. 3, the method 300 may further include one or more of operations 307, 308, and 309, which are also performable by the server machine 110. In addition, the method 300 may include one or more of operations 311, 312, and 313, which may be performed by the device 130 (e.g., a first device, such as a first client device). Furthermore, as illustrated in FIG. 3, the method 300 may include one or more of operations 321 and 322, which may be performed by the device 140 (e.g., a second device, such as a second client device). Additional operations of the method 300 may be performed by the device 150 (e.g., a third device, such as a third client device). In some example embodiments, the devices 130, 140, and 150 are distinct from each other, while in alternative example embodiments, the functions of two or more of the devices 130, 140, and 150 are combined into a single device.

As shown in FIG. 3, the device 130 (e.g., first device) requests data from the server machine 110 by performing operation 311, in which the device 130 communicates a request (e.g., first request) for provision of data that is specified by the request. At the server machine 110, the request handler 210 performs operation 301 by receiving the request (e.g., first request) communicated by the device 130 (e.g., first device). Based on (e.g., in response to) the request, the data streamer 220 of the server machine 110 performs operation 302 by creating a datastream (e.g., first datastream) that contains the data specified by the request (e.g., first request). The creating of the datastream may include one or more of retrieving (e.g., from the database 115), pre-processing (e.g., formatting), and queuing (e.g., buffering) the data specified in the request received in operation 301.

The data streamer 220 also performs operation 303 by initiating provision (e.g., first provision) of the created datastream to the device 130 (e.g., first device), to begin fulfilling the request (e.g., first request) received in operation 301. In some example embodiments, the datastream is provided (e.g., streamed) as it is being created. In response to operation 303, the device 130 (e.g., first device) performs operation 312 by starting to receive the datastream that is being provided by the server machine 110.

To indicate that the provision (e.g., first provision) of the datastream is not yet complete (e.g., currently incomplete and still in progress), the marker manager 230 of the server machine 110 performs operation 304 by creating the marker file 260 (e.g., in the filesystem 280, in the data cache 250, or both). As noted above, existence of the created marker file 260 indicates that the provision (e.g., first provision) of the datastream to the device 130 (e.g., first device) is incomplete.

As further shown in FIG. 3, the device 140 (e.g., second device) requests the same data from the server machine 110 by performing operation 321, in which the device 140 communicates its own request (e.g., second request) for provision of the data, and this request (e.g., second request) specifies the data to be provided. This same data has now been specified in two requests: first in the request sent from the device 130 (e.g., first device), and second in the request sent from the device 140 (e.g., second device). At the server machine 110, the request handler 210 performs operation 305 by receiving the request (e.g., second request) communicated by the device 140 (e.g., second device). At the time this occurs, the marker file 260 exists (e.g., is present within the filesystem 280), which indicates that the initiated provision (e.g., first provision) of the created datastream to the device 130 (e.g., first device) has not been completed (e.g., is still in progress). Based on this second request being received while the marker file 260 exists (e.g., within the filesystem 280), the cache manager 240 of the server machine 110 performs operation 306 by caching the twice-requested (e.g., twice-specified) data. In particular, the cache manager 240 caches the data in the data cache 250. For example, the data may be stored in the cache file 270 within the data cache 250.

After the data is cached in the data cache 250, the data streamer 220 of the server machine 110 performs operation 307 by initiating provision (e.g., second provision) of the cached data to the device 140 (e.g., second device), to begin fulfilling the request (e.g., second request) received in operation 305. The cached data is provided (e.g., directly) from the data cache 250 (e.g., from the cache file 270), without creating a datastream from scratch (e.g., without one or more of retrieving, pre-processing, or queuing the data). In response to operation 307, the device 140 (e.g., second device) performs operation 322 by starting to receive the data (e.g., contained in a second datastream) that is being provided by the server machine 110.

As additionally shown in FIG. 3, the data streamer 220 of the server machine 110 performs operation 308 by finishing the provision (e.g., first provision) of the datastream to the device 130 (e.g., first device). Operation 308 may be performed at any point after operation 305, in which the second request for the same data is received by the request handler 210 of the server machine 110. In response to operation 308, the device 130 (e.g., first device) performs operation 313 by finishing its receiving of the datastream provided by the server machine 110 (e.g., in fulfillment of the request sent in operation 311).

According to example embodiments illustrated in FIG. 3, the marker manager 230 of the server machine 110 performs operation 309 by deleting the marker file 260 in the data cache 250 in response to one or more of operations 308 and 313. In such example embodiments, the non-existence (e.g., by deletion) of the marker file 260 indicates that the provision (e.g., first provision) of the datastream to the device 130 (e.g., first device) has been completed.

Figure 4:
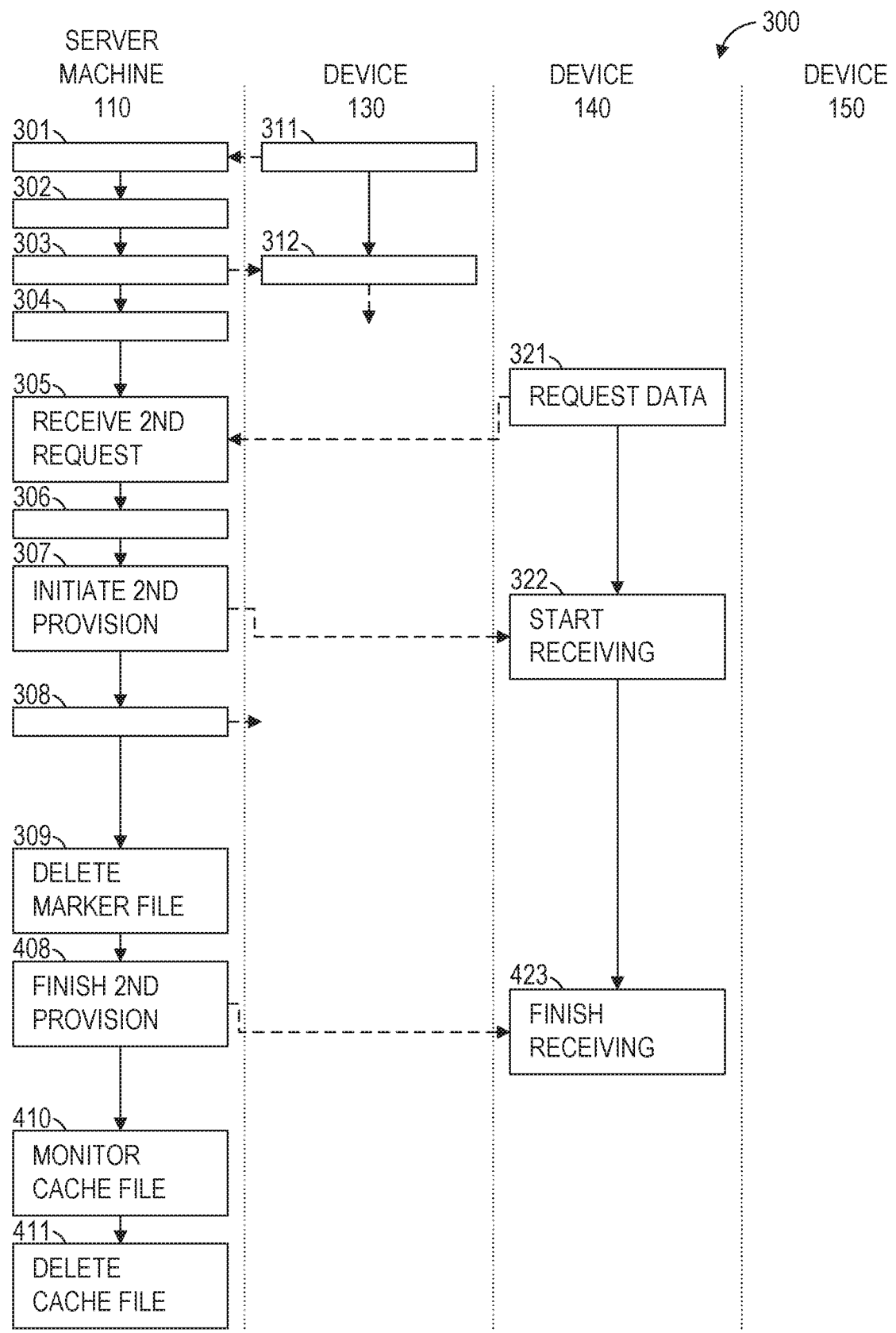

As shown in FIG. 4, the method 300 may include one or more of operations 408, 410, 411, and 423. Operations 408 and 423 may be performed at any point after operations 307 and 322, respectively. In operation 408, the data streamer 220 of the server machine 110 finishes the provision (e.g., second provision) of the cached data from the data cache 250 (e.g., directly from the cache file 270) to the device 140 (e.g., second device). In response to operation 408, the device 140 (e.g., second device) performs operation 423 by finishing its receiving of the cached data provided by the server machine 110 (e.g., in fulfillment of the request sent in operation 321).

As noted above, the marker manager 230 of the server machine 110 may perform operation 309 to delete the marker file 260. In the example embodiments illustrated in FIG. 4, existence of the marker file 260 indicates that the first request for the data is still being fulfilled, and the deletion of the marker file 260 in operation 309 may be performed at any point after operation 308, in which the data streamer 220 of the server machine 110 finishes the provision (e.g., first provision) of the datastream to the device 130 (e.g., first device).

As further shown in FIG. 4, the method 300 may include one or more of operations 410 and 411. In operation 410, the cache manager 240 of the server machine 110 monitors accesses of the cached data (e.g., in the cache file 270) within the data cache 250. For example, the cache manager 240 may execute one or more API calls or system calls that return information (e.g., timestamps) indicating when the cache file 270 was last accessed (e.g., read or opened for reading). In operation 411, the cache manager 240 deletes the cached data (e.g., the cache file 270) from the data cache 250 based on a comparison of the monitored accesses to a predetermined threshold period of time (e.g., a maximum age or an expiration time). For example, the cached data may be deleted based on the most recent access of the cached data being older than a predetermined threshold age (e.g., maximum age of the cache file 270). This may have the effect of no longer caching the cached data when the cached data is no longer frequently requested, thus obtaining more efficient usage of the data cache 250.

In some example embodiments, the threshold period of time is predetermined prior to execution of the method 300 (e.g., hardcoded), while in other example embodiments, the threshold period of time is predetermined in the sense of being dynamically determined during execution of the method 300 (e.g., at or by the time operation 411 is performed). Such dynamic determination of the threshold period of time may be based on one or more factors. Examples of such additional factors include: the time elapsed since the previous similar request (e.g., the first request), the number and timing of previous similar requests (e.g., whether their corresponding responses were cached or not), the computational expense of preparing responses to previous similar requests (e.g., non-cached responses), the current processor load, the current processor capacity, the amount of storage space that the data cache has available, the amount of storage space that the response would occupy in the data cache, whether the incoming request (e.g., second request) was initiated by a user who has paid for a particular level of service (e.g., a premium level service), or any suitable combination thereof.

Figure 5:
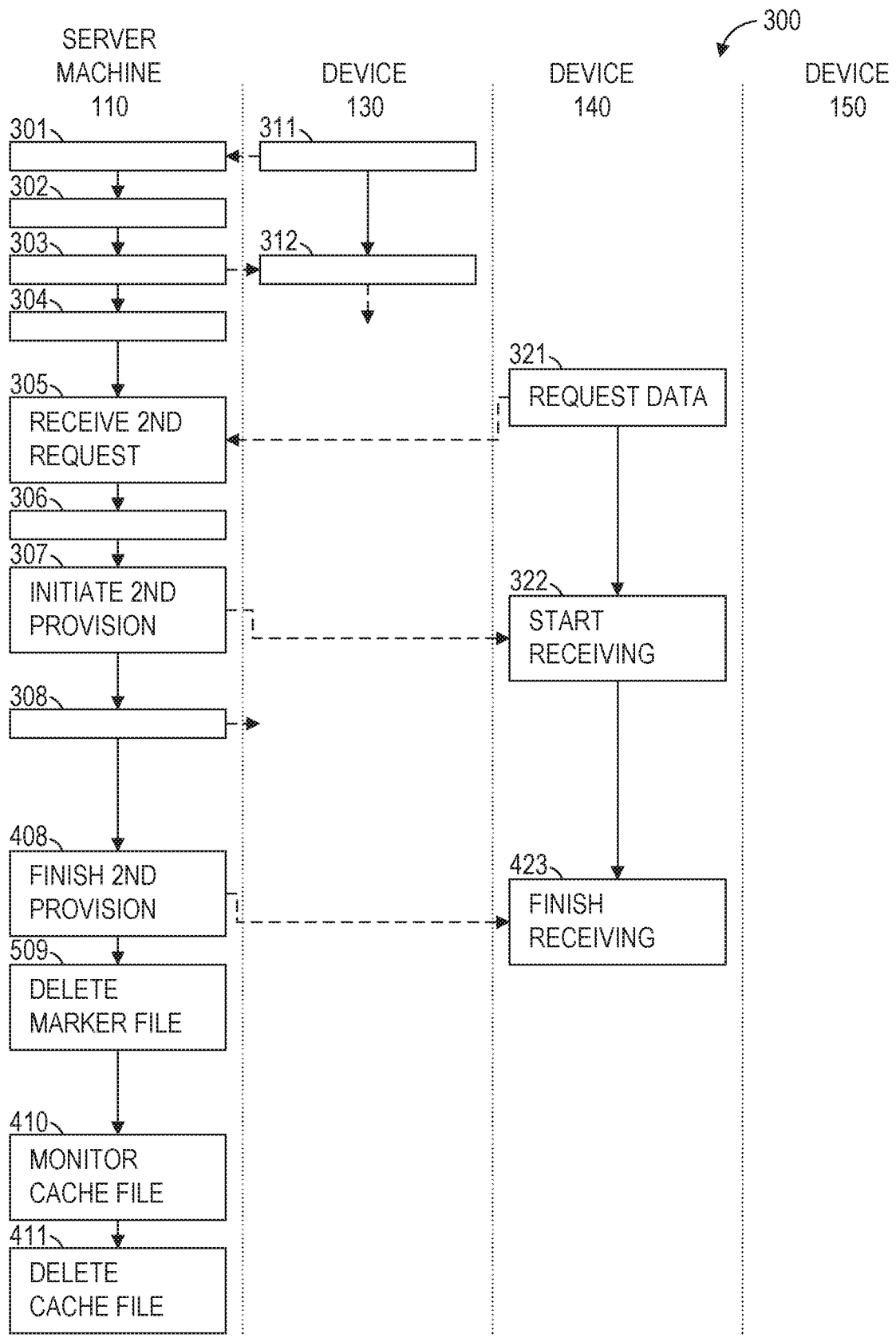

As shown in FIG. 5, the method 300 may include operation 509 (e.g., instead of operation 309). It was noted above that, in performing operation 309, the marker manager 230 of the server machine 110 deletes the marker file 260. In the example embodiments illustrated in FIG. 5, existence of the marker file 260 indicates that the first two requests for the data are still being fulfilled. For example, existence of the marker file 260 may indicate that at least one of the request (e.g., first request) from the device 130 (e.g., first device) or the request (e.g., second request, whose reception while the marker file 260 exists caused the caching of the data) from the device 140 (e.g., second device) is still being fulfilled. In such example embodiments, operation 509 may be performed at any point after one or more of operations 408 and 423. In operation 509, the marker manager 230 deletes the marker file 260 in the data cache 250 (e.g., in response to one or more of operations 408 and 423).

As additionally shown in FIG. 5, the method 300 may include one or more of operations 410 and 411, as previously described above. This may have the effect of no longer caching the cached data (e.g., cache file 270) when the cached data is no longer frequently requested, thus obtaining more efficient usage of the data cache 250.

Figure 6:
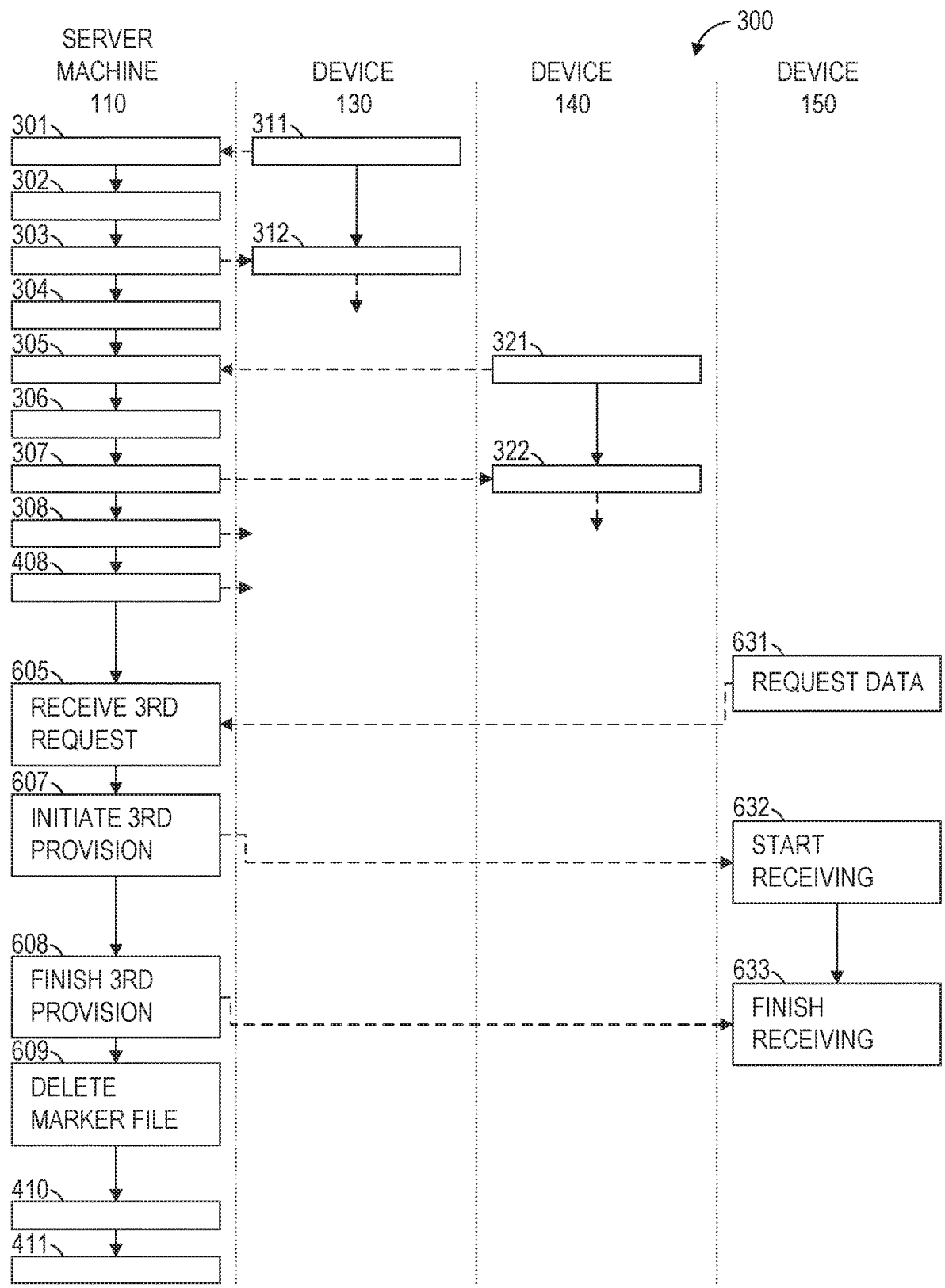

As shown in FIG. 6, the method 300 may include one or more of operations 605, 607, 608, 609, 631, 632, and 633. In the example embodiments illustrated in FIG. 6, the device 150 (e.g., third device) requests the same data from the server machine 110 by performing operation 631, in which the device 150 communicates its own request (e.g., third request) for provision of the data, and this request (e.g., third request) specifies the data to be provided. This same data has now been specified in three requests: first in the request sent from the device 130 (e.g., first device), second in the request sent from the device 140 (e.g., second device), and third in the request sent from the device 150 (e.g., third device).

At the server machine 110, the request handler 210 performs operation 605 by receiving the request (e.g., third request) communicated by the device 150 (e.g., third device). The data specified in this third request, however, is already cached and stored in the data cache 250 (e.g., in the cache file 270).

In response to the request from the device 150 (e.g., third device), the data streamer 220 of the server machine 110 performs operation 607 by initiating provision (e.g., third provision) of the cached data to the device 150 (e.g., third device), to begin fulfilling the request (e.g., third request) received in operation 605. The cached data is provided (e.g., directly) from the data cache 250 (e.g., from the cache file 270), without creating a datastream from scratch (e.g., without one or more of retrieving, pre-processing, or queuing the data). In response to operation 607, the device 150 (e.g., third device) performs operation 622 by starting to receive the data (e.g., contained in a third datastream) that is being provided by the server machine 110.

Accordingly, operations 608 and 633 may be performed at any point after operations 607 and 632, respectively. In operation 608, the data streamer 220 of the server machine 110 finishes the provision (e.g., third provision) of the cached data from the data cache 250 (e.g., directly from the cache file 270) to the device 150 (e.g., third device). In response to operation 608, the device 150 (e.g., third device) performs operation 633 by finishing its receiving of the cached data provided by the server machine 110 (e.g., in fulfillment of the request sent in operation 631).

In the example embodiments illustrated in FIG. 6, existence of the marker file 260 indicates that any outstanding request (e.g., from any of the devices 130, 140, or 150) for the data is still being fulfilled. For example, existence of the marker file 260 may indicate that at least one of the request (e.g., first request) from the device 130 (e.g., first device), the request (e.g., second request, whose reception while the marker file 260 exists caused the caching of the data) from the device 140 (e.g., second device), or the request (e.g., third request) from the device 150 (e.g., third device) is still being fulfilled. In such example embodiments, operation 609 may be performed at any point after one or more of operations 608 and 633. In operation 609, the marker manager 230 deletes the marker file 260 in the data cache 250 (e.g., in response to one or more of operations 608 and 633).

As additionally shown in FIG. 6, the method 300 may include one or more of operations 410 and 411, as previously described above. This may have the effect of no longer caching the cached data (e.g., cache file 270) when the cached data is no longer frequently requested, thus obtaining more efficient usage of the data cache 250.

Figure 7:
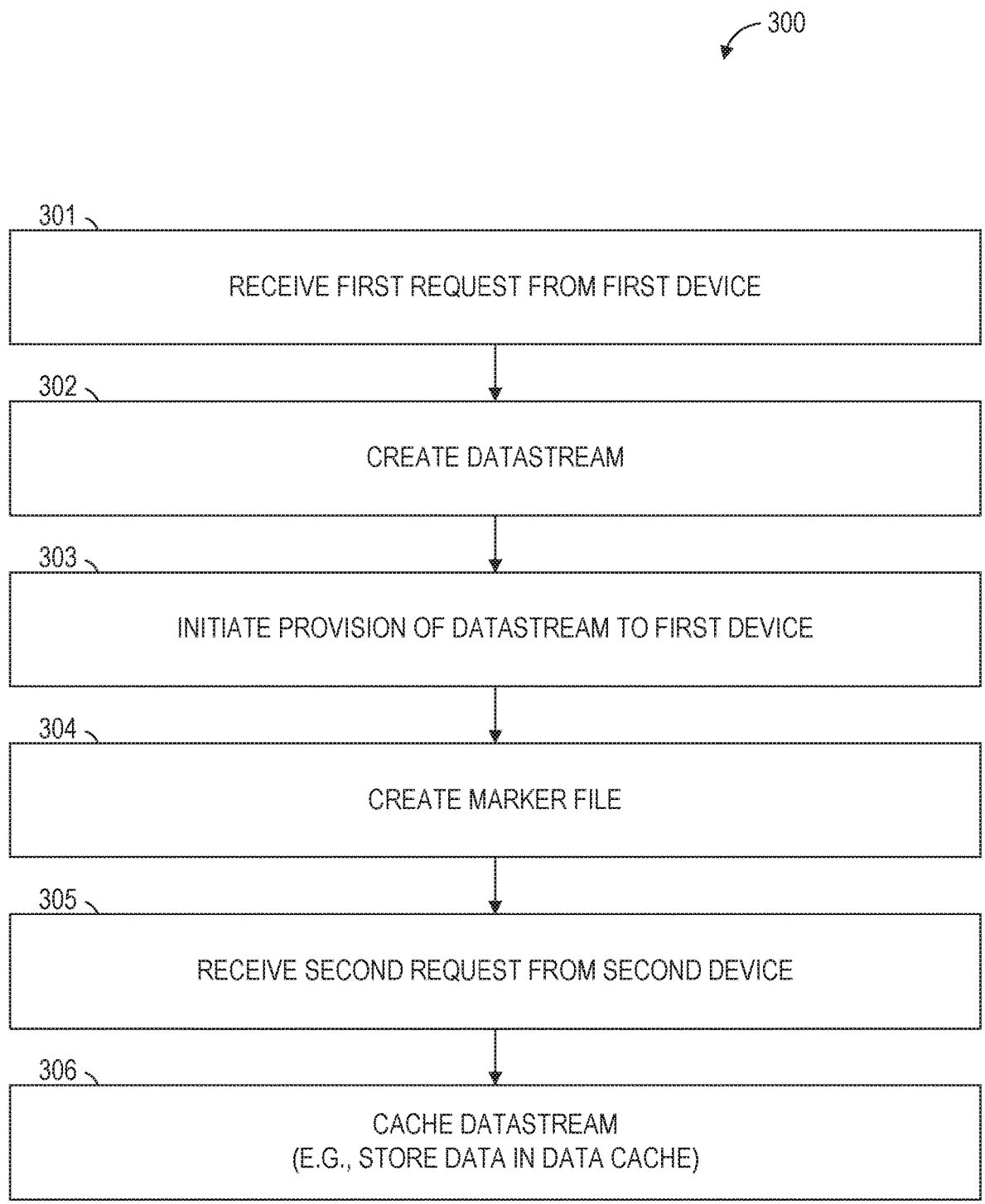
FIGS. 7, 8, and 9 are flowcharts illustrating operations of the server machine in performing the method of response caching, according to some example embodiments.
Figure 8:
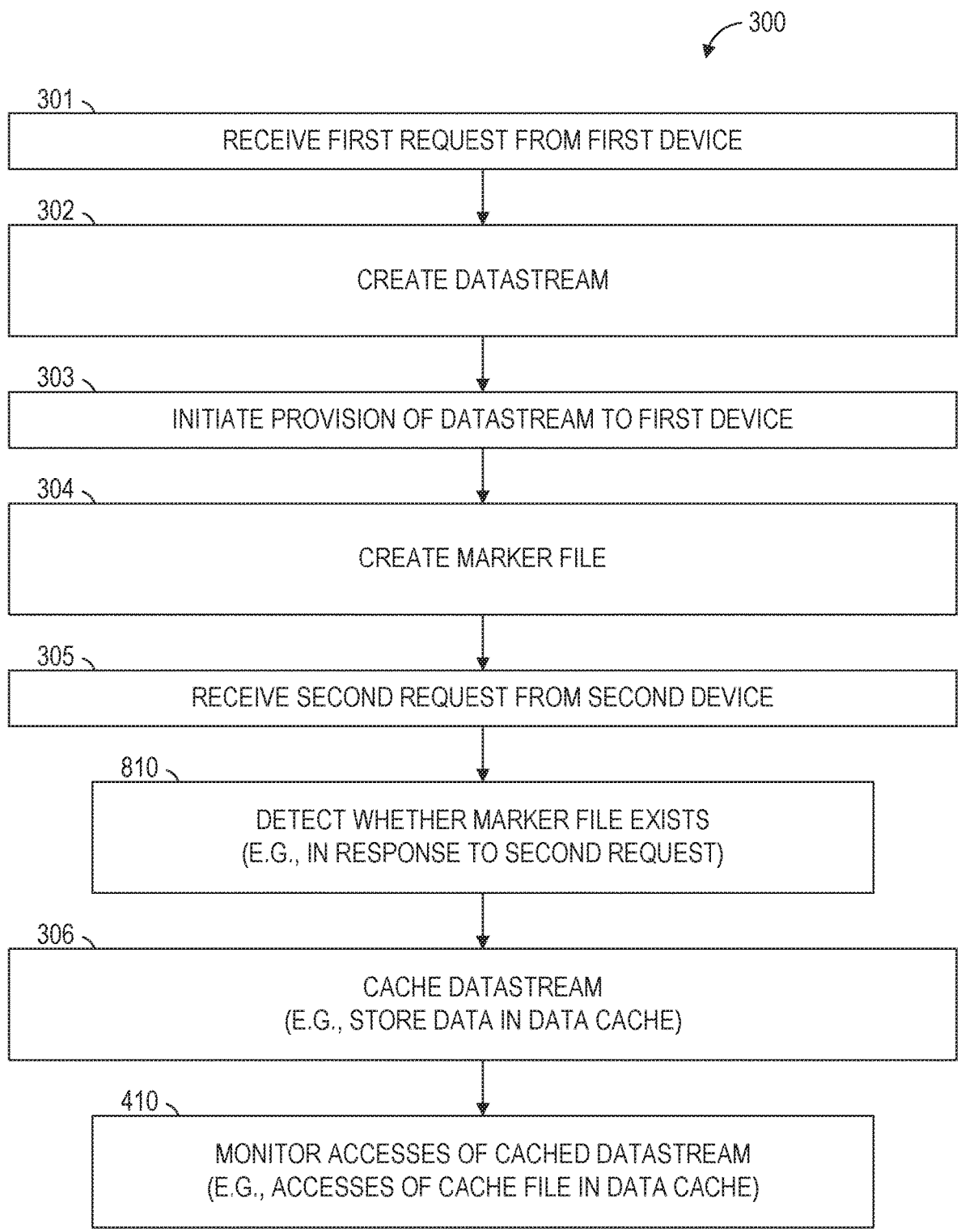
Figure 9:
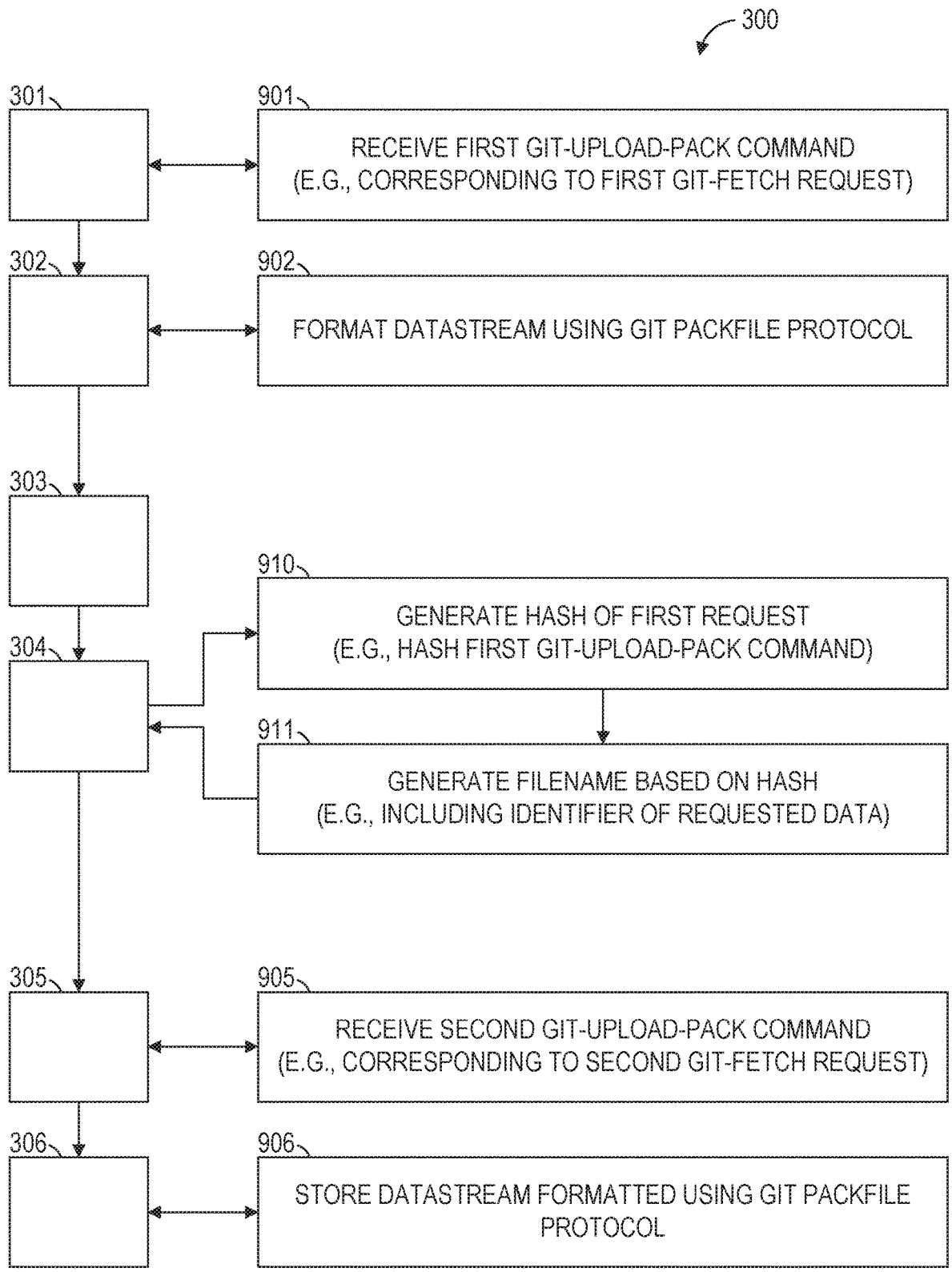

FIGS. 7, 8, and 9 are flowcharts illustrating operations of the server machine 110 in performing the method 300 of response caching, according to some example embodiments. As shown in FIG. 7, some example embodiments of the method 300 includes operations 301, 302, 303, 304, 305, and 306, which were previously described above.

As shown in FIG. 8, some example embodiments of the method 300 further include operation 810, as well as operation 410 as previously described above. In operation 810, the marker manager 230 of the server machine 110 detects whether the created marker file 260 exists (e.g., within the filesystem 280, within the data cache 250, or both). For example, the marker manager 230 may execute one or more API calls or system calls that check for the existence or nonexistence of the marker file 260. This detection may be performed in response to receiving of the request (e.g., second request) from the device 150 (e.g., second device) in operation 305.

In example embodiments that include operation 810, the caching of the data in operation 306 may be performed based on (e.g., in response to) the detection performed in operation 810. For example, operation 306 may be performed in response to a detection that the created marker file 260 exists contemporaneously with the receiving of the request (e.g., second request) in operation 305. As illustrated in FIG. 8, after the caching of the data in operation 306, the cache manager 240 of the server machine 110 may perform operation 410 by monitoring the data cache 250 (e.g., on a regular, periodic, or other ongoing basis) for accesses of the cached data (e.g., in the cache file 270) within the data cache 250. For example, the cache manager 240 may execute one or more API calls or system calls that return information (e.g., timestamps) indicating when the cache file 270 was last accessed (e.g., provided to any device, such as the devices 130, 140, and 150).

As shown in FIG. 9, the method 300 may include one or more of operations 901, 902, 905, 906, 910, and 911, according to various example embodiments. Example embodiments that include one or more of operations 901, 902, 905, 906, 910, and 911 may be suitable for limitations in which the server machine 110 is or includes a special kind of software distribution server called a git server.

Operation 901 may be performed as part (e.g., a precursor task, a subroutine, or a portion) of operation 301, in which the request handler 210 of the server machine 110 receives the request (e.g., first request) from the device 130 (e.g., first device) for provision of the data specified in that request (e.g., first request). In operation 901, the request handler 210 receives a first git-upload-pack command that specifies the data (e.g., in the form of one or more gits) to be provided to the device 130 (e.g., first device). The first git-upload-pack command may correspond to (e.g., result from processing of) a first git-fetch request for the specified data, and the first git-fetch request may be generated, sent, or both, by the device 130 (e.g., first device) at the direction of the user 132 (e.g., first user). According to various example embodiments, the first git-fetch request is processed (e.g., by an API processor or other component of the server machine 110) and translated into the first git-upload-pack command. Additional git-fetch requests may be similarly processed to obtain corresponding get-upload-pack commands.

In example embodiments that include operation 901, the providing of the datastream (e.g., first providing or first provision of the data) to the device 130 (e.g., first device) in accordance with operations 303 and 308 may be performed in response to the first git-upload-pack command and in fulfillment of the first git-fetch request. Furthermore, the marker file 260 may correspond to the first git-upload-pack command, and the deleting of the marker file 260 in operation 309, 509, or 609 therefore may be performed based on (e.g., in response to) completion of the providing of the datastream to the device 130 (e.g., first device) from which the first git-upload-pack command was received in operation 901.

Operation 902 may be performed as part of operation 302, in which the data streamer 220 of the server machine 110 creates the datastream to contain and deliver the requested data (e.g., the one or more gits). As noted above, the creation of the datastream may include pre-processing operations (e.g., formatting operations). In operation 902, the data streamer 220 creates the datastream format in accordance with a git packfile protocol. That is, the data streamer 220 formats the datastream according to the git packfile protocol. In example embodiments that include operation 902, operation 906 may be performed as part of operation 306, as described below.

Operation 905 may be performed as part of operation 305, in which the request handler 210 of the server machine 110 receives a request (e.g., second request) from the device 140 for provision of the data specified in that request (e.g., second request). In operation 905, the request handler 210 receives a second git-upload-pack command that specifies the data (e.g., in the form of one or more gits) to be provided to the device 140 (e.g., second device). The second git-upload-pack command may correspond to (e.g., result from processing of) a second git-fetch request for the specified data, and the second git-fetch request may be generated, sent, or both, by the device 140 (e.g., second device) at the direction of the user 142 (e.g., second user).

In example embodiments that include operation 905, the providing of the cached data to the device 140 (e.g., second device) in accordance with operations 307 and 408 may be performed in response to the second git-upload-pack command and in fulfillment of the second git-fetch request. Furthermore, performance of operation 810, which includes detecting whether the marker file 260 exists, may be performed based on (e.g., in response to) the second git-upload-pack command, and the caching of the data in operation 306 may be performed based on a detection that the created marker file 260 exists contemporaneously with the receiving of the second git-upload-pack command in operation 905.

Operation 906 may be performed as part of operation 306, in which the cache manager 240 of the server machine 110 caches the data contained in the datastream provided to the device 130 (e.g., first device). As noted above, the datastreamer 220 of the server machine 110 may perform operation 902 by formatting the datastream according to the git packfile protocol. In example embodiments that include operation 902, the cache manager 240 caches the data by storing the formatted data in the data cache 250. That is, the data formatted according to the git packfile protocol is stored in the data cache 250 (e.g., in the cache file 270). This may have the effect of enabling the provision (e.g., second provision) of the data (e.g., second providing or second provision of the datastream to the device 140 (e.g., second device) to be performed by streaming the data (e.g., within a second datastream) already formatted according to the git packfile protocol. An additional effect may be enabling the provision (e.g., third provision) of the data to the device 150 (e.g., third device) to also stream the data (e.g., within a third datastream) already formatted according to the git packfile protocol.

As shown in FIG. 9, one or more of operations 910 and 911 may be performed as part of operation 304, in which the marker file 260 is created by the marker manager 230 of the server machine 110. In operation 910, the marker manager 230 generates a hash of the request (e.g., first request, which may be the first git-upload-pack command) received from the device 130 (e.g., first device). For example, the marker manager 230 may hash the request (e.g., by applying a hashing algorithm to the request). Since the request specifies the data to be provided to the device 130, the generated hash may likewise specify or otherwise identify the data to be provided to the device 130.

In operation 911, the marker manager 230 generates a filename of the marker file 260. The filename may be generated based on the hash generated in operation 910. Accordingly, in example embodiments in which the generated hash identifies the data to be provided to the device 130, the generated filename of the marker file 260 may likewise specify or otherwise identify the data to be provided to the device 130. This filename may thus enable the server machine 110 (e.g., via the request handler 210, the data streamer 220, or both) to efficiently recognize when subsequent requests (e.g., received in operations 305 and 605) specify the same data cached in operation 306.

According to various example embodiments, one or more of the methodologies described herein may facilitate response caching. Moreover, one or more of the methodologies described herein may facilitate one or more software distribution services from a software distribution server (e.g., server machine 110) to various client devices (e.g., devices 130, 140, and 150). Hence, one or more of the methodologies described herein may facilitate resource-efficient provision of specified data to one or more users (e.g., users 132, 142, and 152).

When these effects are considered in aggregate, one or more of the methodologies described herein may obviate a need for certain efforts or resources that otherwise would be involved in response caching or other operations involved in software distribution. Efforts expended by a user (e.g., a system administrator) in maintaining a software distribution server (e.g., server machine 110) may be reduced by use of (e.g., reliance upon) a special-purpose machine that implements one or more of the methodologies described herein. Similarly, efforts expended by a user (e.g., a software developer) in obtaining software (e.g., gits) may be reduced by use of such a special-purpose machine. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
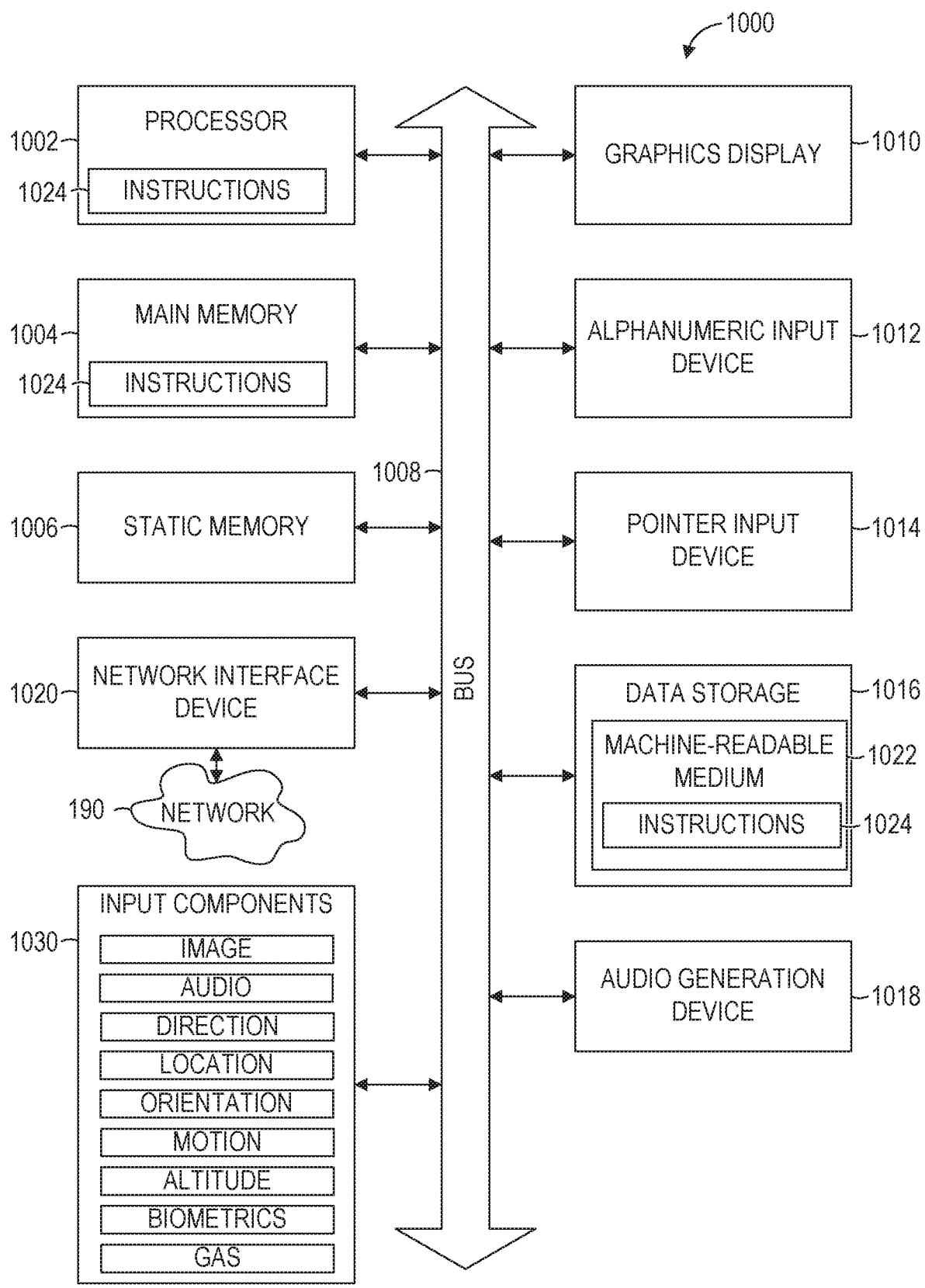
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1024 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an API). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
receiving, from a first client device, a first request for provision of data specified by the first request;
creating, by one or more processors of a machine, a datastream that contains the data specified by the first request and initiating provision of the datastream to the first client device;
creating, by one or more processors of the machine, a marker file that corresponds to the first request, existence of the marker file indicating that the provision of the datastream to the first client device is incomplete;
receiving, from a second client device while the marker file exists, a second request for provision of the data, the data being specified by the second request; and
caching, by one or more processors of the machine, the data specified by the first and second requests in a data cache in response to the second request being received while the marker file exists and indicates that the provision of the datastream to the first client device is incomplete.

A second embodiment provides a method according to the first embodiment, further comprising:
providing the datastream to the first client device in response to the first request for provision of the data; and
providing the cached data from the data cache to the second client device in response to the second request for provision of the data.

A third embodiment provides a method according to the second embodiment, further comprising:
deleting the marker file that corresponds to the first request in response to completion of the providing of the datastream to the first client device from which the first request was received.

A fourth embodiment provides a method according to the second embodiment, further comprising:
deleting the marker file that corresponds to the first request in response to completion of the providing of the cached data from the data cache to the second client device from which the second request was received.

A fifth embodiment provides a method according to any of the second through fourth embodiments, wherein:
the creating of the marker file creates the marker file within a filesystem; and
the caching of the data stores the created datastream in the data cache by storing the created datastream in a cache file within the filesystem that stores the marker file.

A sixth embodiment provides a method according to the fifth embodiment, wherein:
the providing of the cached data to the second client device provides the stored datastream from the cache file to the second client device.

A seventh embodiment provides a method according to any of the first through sixth embodiments, further comprising:
receiving, from a third client device, a third request for provision of the data, the data being specified by the first, second, and third requests and stored in the data cache; and
providing the cached data from the data cache to the third client device in response to the third request for provision of the data.

An eighth embodiment provides a method according to the seventh embodiment, further comprising:
deleting the marker file that corresponds to the first request in response to completion of the providing of the cached data from the data cache to the third client device from which the third request was received.

A ninth embodiment provides a method according to any of the first through eighth embodiments, further comprising:
monitoring accesses of the cached data stored in the data cache; and
deleting the cached data from the data cache based on a comparison of the monitored accesses to a predetermined threshold period of time.

A tenth embodiment provides a method according to any of the first through ninth embodiments, further comprising:
detecting whether the created marker file exists, the detecting being in response to the receiving of the second request for provision of the data; and wherein
the caching of the data specified by the first and second requests is in response to a detection that the created marker file exists contemporaneously with the receiving of the second request for provision of the data.

An eleventh embodiment provides a method according to the first embodiment or the ninth embodiment, wherein:
the receiving of the first request includes receiving a first git-upload-pack command that corresponds to a first git-fetch request for the data:
the receiving of the second request includes receiving a second git-upload-pack command that corresponds to a second git-fetch request for the data, the data being specified by the first and second git-fetch requests and specified by the first and second git-upload-pack commands; and
the method further comprises:
providing the datastream to the first client device in response to the first git-upload-pack command and in fulfillment of the first git-fetch request.

A twelfth embodiment provides a method according to the eleventh embodiment, further comprising:
providing the cached data from the data cache to the second client device in response to the second git-upload-pack command and in fulfillment of the second git-fetch request.

A thirteenth embodiment provides a method according to the eleventh embodiment or the twelfth embodiment, wherein:

the marker file corresponds to the first git-upload-pack command; and the method further comprises:

deleting the marker file that corresponds to the first git-upload-pack command in response to completion of the providing of the datastream to the first client device from which the first git-upload-pack command was received.

A fourteenth embodiment provides a method according to any of the eleventh through thirteenth embodiments, further comprising:

detecting whether the created marker file exists, the detecting being in response to the receiving of the second git-upload-pack command; and wherein the caching of the data specified by the first and second git-upload-pack commands is in response to a detection that the created marker file exists contemporaneously with the receiving of the second git-upload-pack command.

A fifteenth embodiment provides a method according to any of the first through fourteenth embodiments, wherein:

the creating of the datastream creates the datastream formatted in accordance with a git packfile protocol; and the caching of the data stores the data in the data cache and formatted in accordance with the git packfile protocol.

A sixteenth embodiment provides a method according to any of the first through fifteenth embodiments, wherein:

the creating of the marker file, whose existence indicates that the provision of the datastream to the first client device is incomplete, includes:

generating a hash of the first request that specifies the data to be provided to the first client device, the generated hash identifying the data to be provided to the first client device; and generating a filename of the marker file based on the generated hash of the first request, the generated filename including an identifier of the data to be provided to the first client device.

A seventeenth embodiment provides a machine-readable medium (e.g., a non-transitory machine-readable storage medium) comprising instructions that, when executed by one or more processors of a machine, cause the machine to perform operations comprising:

receiving, from a first client device, a first request for provision of data specified by the first request;

creating a datastream that contains the data specified by the first request and initiating provision of the datastream to the first client device;

creating a marker file that corresponds to the first request, existence of the marker file indicating that the provision of the datastream to the first client device is incomplete;

receiving, from a second client device while the marker file exists, a second request for provision of the data, the data being specified by the second request; and caching the data specified by the first and second requests in a data cache in response to the second request being received while the marker file exists and indicates that the provision of the datastream to the first client device is incomplete.

The eighteenth embodiment provides a machine-readable medium according to the seventeenth embodiment, wherein:

the second client device is distinct from the first client device.

A nineteenth embodiment provides a system (e.g., server machine 110) comprising:

one or more processors; and a memory storing instructions that, when executed by at least one processor among the one or more processors, cause the system to perform operations comprising:

receiving, from a first client device, a first request for provision of data specified by the first request;

creating a datastream that contains the data specified by the first request and initiating provision of the datastream to the first client device;

creating a marker file that corresponds to the first request, existence of the marker file indicating that the provision of the datastream to the first client device is incomplete;

receiving, from a second client device while the marker file exists, a second request for provision of the data, the data being specified by the second request; and caching the data specified by the first and second requests in a data cache in response to the second request being received while the marker file exists and indicates that the provision of the datastream to the first client device is incomplete.

A twentieth embodiment provides a system according to the nineteenth embodiment, wherein, in the operations:

the creating of the marker file, whose existence indicates that the provision of the datastream to the first client device is incomplete, includes:

generating a hash of the first request that specifies the data to be provided to the first client device, the generated hash identifying the data to be provided to the first client device; and generating a filename of the marker file based on the generated hash of the first request, the generated filename including an identifier of the data to be provided to the first client device.

A twenty-first embodiment provides a carrier medium carrying machine-readable instructions for controlling a machine to carry out the operations recited in (e.g., the method of) any one of the previously described embodiments.

What is claimed is:

1. A method comprising:

receiving, from a first client device, a first request for provision of data specified by the first request;

creating, by one or more processors of a machine, a datastream that contains the data specified by the first request and initiating provision of the datastream to the first client device;

creating, by one or more processors of the machine, a marker file that corresponds to the first request, existence of the marker file indicating that the provision of the datastream to the first client device is incomplete, wherein the marker file will be deleted when the provision of the data to the first client is complete;

receiving, from a second client device, a second request for provision of data, the second request for provision of data being for data that includes or that is the same as the data specified by the first request;

determining that the marker file exists that corresponds to provision of the data specified by the first request; and in response to the determination that said marker file exists which corresponds to the provision of the data specified by the first request, caching, by one or more processors of the machine, the data specified by the first request in a data cache.

2. The method of claim 1, further comprising:

providing the datastream to the first client device in response to the first request for provision of the data; and providing the cached data from the data cache to the second client device in response to the second request for provision of the data.

3. The method of claim 2, further comprising:

deleting the marker file that corresponds to the first request in response to completion of the providing of the datastream to the first client device from which the first request was received.

4. The method of claim 2, further comprising:

deleting the marker file that corresponds to the first request in response to completion of the providing of the cached data from the data cache to the second client device from which the second request was received.

5. The method of claim 2, wherein:

the creating of the marker file creates the marker file within a filesystem; and the caching of the data stores the created datastream in the data cache by storing the created datastream in a cache file within the filesystem that stores the marker file.

6. The method of claim 5, wherein:

the providing of the cached data to the second client device provides the stored datastream from the cache file to the second client device.

7. The method of claim 1, further comprising:

receiving, from a third client device, a third request for provision of the data, the data being specified by the first, second, and third requests and stored in the data cache; and providing the cached data from the data cache to the third client device in response to the third request for provision of the data.

8. The method of claim 7, further comprising:

deleting the marker file that corresponds to the first request in response to completion of the providing of the cached data from the data cache to the third client device from which the third request was received.

9. The method of claim 1, further comprising:

monitoring accesses of the cached data stored in the data cache; and deleting the cached data from the data cache based on a comparison of the monitored accesses to a predetermined threshold period of time.

10. The method of claim 1, further comprising:

detecting whether the created marker file exists, the detecting being in response to the receiving of the second request for provision of the data; and wherein the caching of the data specified by the first and second requests is in response to a detection that the created marker file exists contemporaneously with the receiving of the second request for provision of the data.

11. The method of claim 1, wherein:

the receiving of the first request includes receiving a first git-upload-pack command that corresponds to a first git-fetch request for the data;

the receiving of the second request includes receiving a second git-upload-pack command that corresponds to a second git-fetch request for the data, the data being specified by the first and second git-fetch requests and specified by the first and second git-upload-pack commands; and the method further comprises:

providing the datastream to the first client device in response to the first git-upload-pack command and in fulfillment of the first git-fetch request.

12. The method of claim 11, further comprising:

providing the cached data from the data cache to the second client device in response to the second git-upload-pack command and in fulfillment of the second git-fetch request.

13. The method of claim 11, wherein:

the marker file corresponds to the first git-upload-pack command; and the method further comprises:

deleting the marker file that corresponds to the first git-upload-pack command in response to completion of the providing of the datastream to the first client device from which the first git-upload-pack command was received.

14. The method of claim 11, further comprising:

detecting whether the created marker file exists, the detecting being in response to the receiving of the second git-upload-pack command; and wherein the caching of the data specified by the first and second git-upload-pack commands is in response to a detection that the created marker file exists contemporaneously with the receiving of the second git-upload-pack command.

15. The method of claim 1, wherein:

the creating of the datastream creates the datastream formatted in accordance with a git packfile protocol; and the caching of the data stores the data in the data cache and formatted in accordance with the git packfile protocol.

16. The method of claim 1, wherein:

the creating of the marker file, whose existence indicates that the provision of the datastream to the first client device is incomplete, includes:

generating a hash of the first request that specifies the data to be provided to the first client device, the generated hash identifying the data to be provided to the first client device; and generating a filename of the marker file based on the generated hash of the first request, the generated filename including an identifier of the data to be provided to the first client device.

17. One or more hardware storage device comprising instructions that, when executed by one or more processors of a machine, cause the machine to perform operations comprising:

receiving, from a first client device, a first request for provision of data specified by the first request;

creating a datastream that contains the data specified by the first request and initiating provision of the datastream to the first client device;

creating a marker file that corresponds to the first request, existence of the marker file indicating that the provision of the datastream to the first client device is incomplete, wherein the marker file will be deleted when the provision of the data to the first client is complete;

receiving, from a second client device, a second request for provision of data, the second request for provision of data being for data that includes or that is the same as the data specified by the first request;

determining that the marker file exists that corresponds to provision of the data specified by the first request; and in response to the determination that said marker file exists which corresponds to the provision of the data specified by the first request, caching the data specified by the first request in a data cache.

18. The one or more hardware storage device of claim 17, wherein:
the second client device is distinct from the first client device.

19. A system comprising:
one or more processors; and
a memory storing instructions that, when executed by at least one processor among the one or more processors, cause the system to perform operations comprising:
receiving, from a first client device, a first request for provision of data specified by the first request;
creating a datastream that contains the data specified by the first request and initiating provision of the datastream to the first client device;
creating a marker file that corresponds to the first request, existence of the marker file indicating that the provision of the datastream to the first client device is incomplete, wherein the marker file will be deleted when the provision of the data to the first client is complete;
receiving, from a second client device, a second request for provision of data, the second request for provision of data being for data that includes or that is the same as the data specified by the first request;
determining that the marker file exists that corresponds to provision of the data specified by the first request; and
in response to the determination that said marker file exists which corresponds to the provision of the data specified by the first request, caching the data specified by the first request in a data cache.

20. The system of claim 19, wherein, in the operations:
the creating of the marker file, whose existence indicates that the provision of the datastream to the first client device is incomplete, includes:
generating a hash of the first request that specifies the data to be provided to the first client device, the generated hash identifying the data to be provided to the first client device; and
generating a filename of the marker file based on the generated hash of the first request, the generated filename including an identifier of the data to be provided to the first client device.

* * * * *